No. 852,635. PATENTED MAY 7, 1907.
H. G. SEDGWICK.
AUTOMATIC ELECTRICAL TRAIN STOP.
APPLICATION FILED NOV. 24, 1905. RENEWED JAN. 2, 1907.

8 SHEETS—SHEET 1.

Witnesses
Edwin L. Yewell
L. B. Bridges

Inventor
H. G. Sedgwick
By
Davis & Davis
Attorneys

No. 852,635. PATENTED MAY 7, 1907.
H. G. SEDGWICK.
AUTOMATIC ELECTRICAL TRAIN STOP.
APPLICATION FILED NOV. 24, 1905. RENEWED JAN. 2, 1907.

8 SHEETS—SHEET 2.

Witnesses
Edwin L. Yewell
L. B. Bridges

Inventor
Hiram G. Sedgwick
By Davis & Davis
Attorneys

No. 852,635. PATENTED MAY 7, 1907.
H. G. SEDGWICK.
AUTOMATIC ELECTRICAL TRAIN STOP.
APPLICATION FILED NOV. 24, 1905. RENEWED JAN. 2, 1907.
8 SHEETS—SHEET 3.
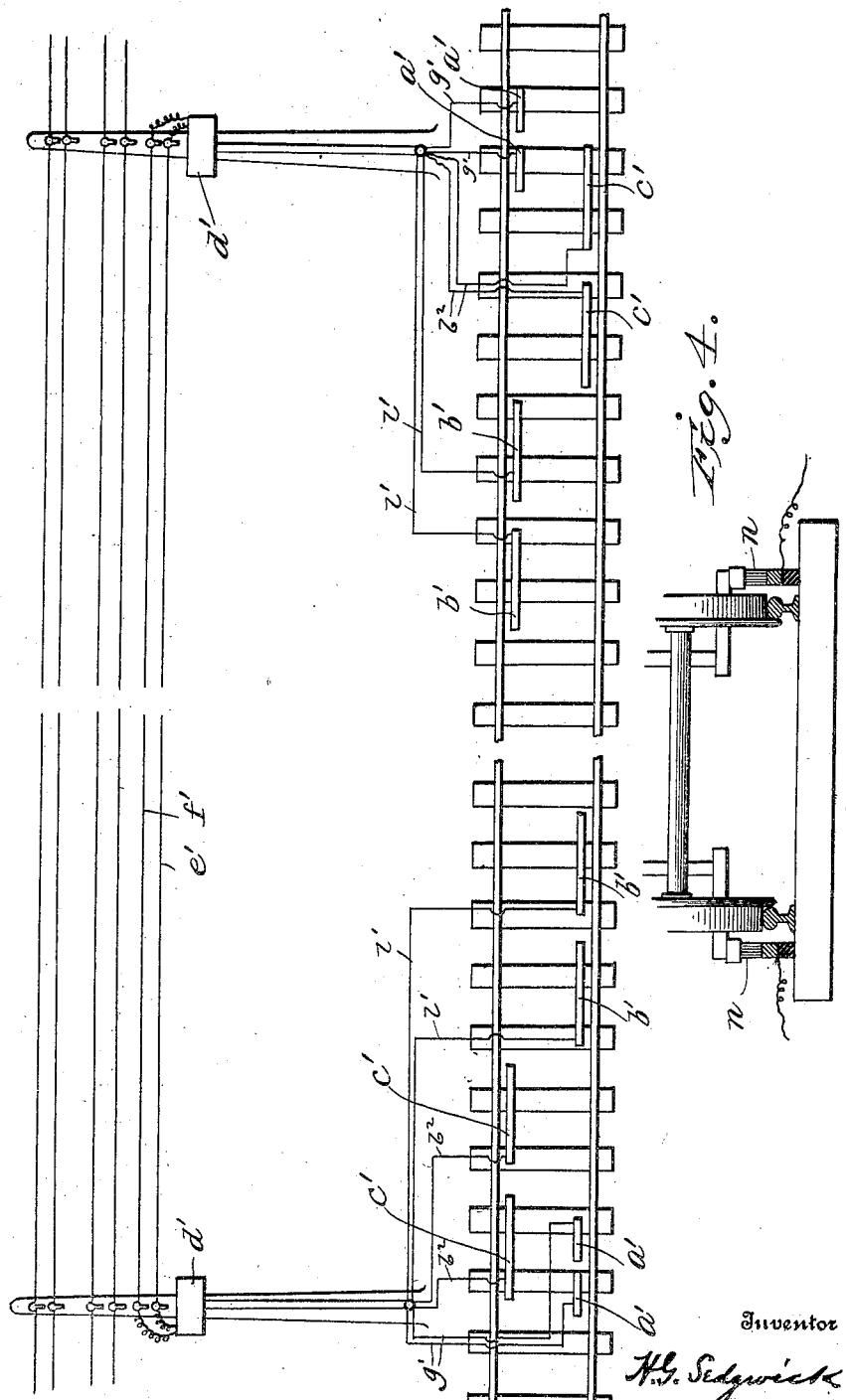

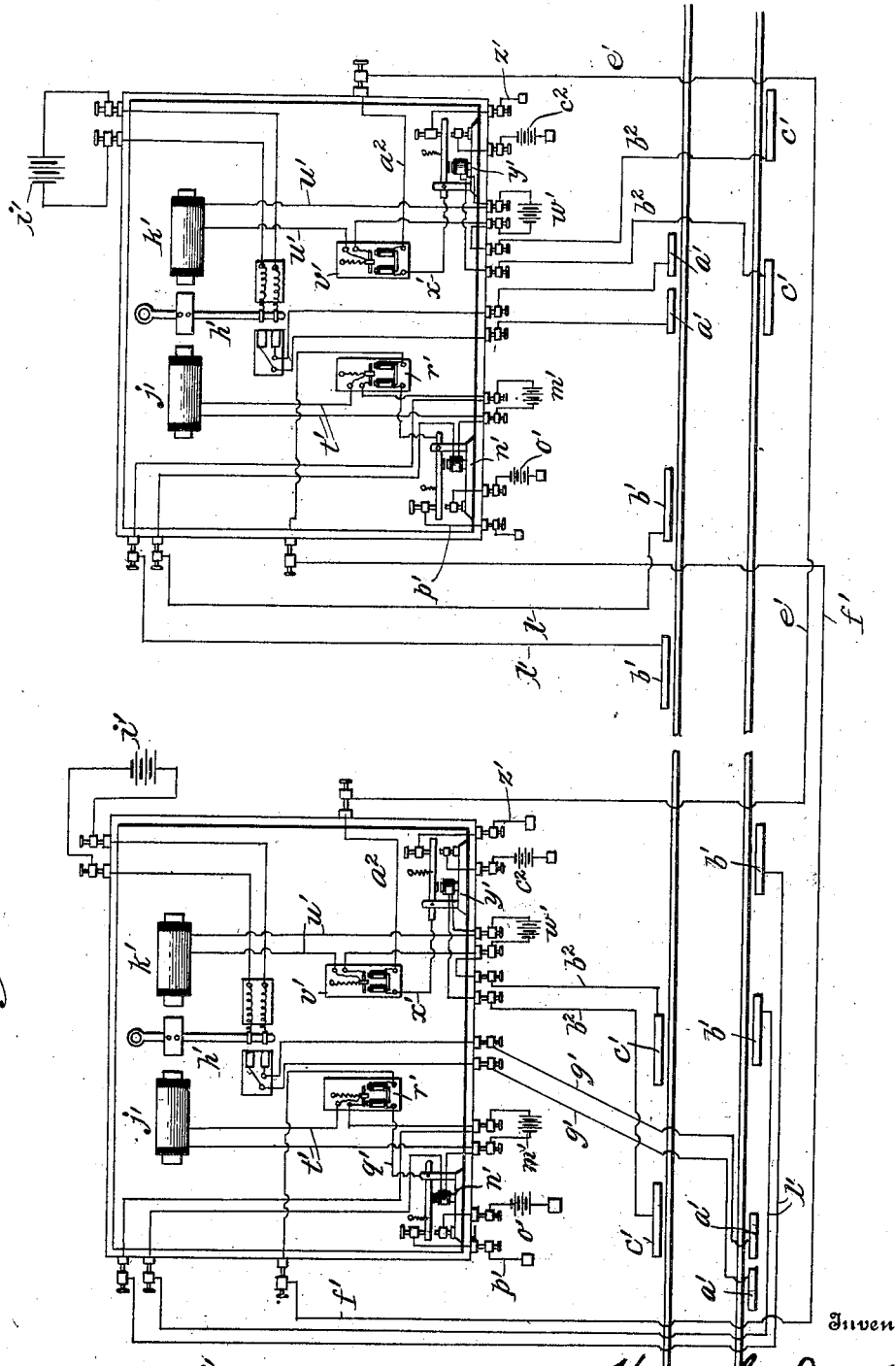

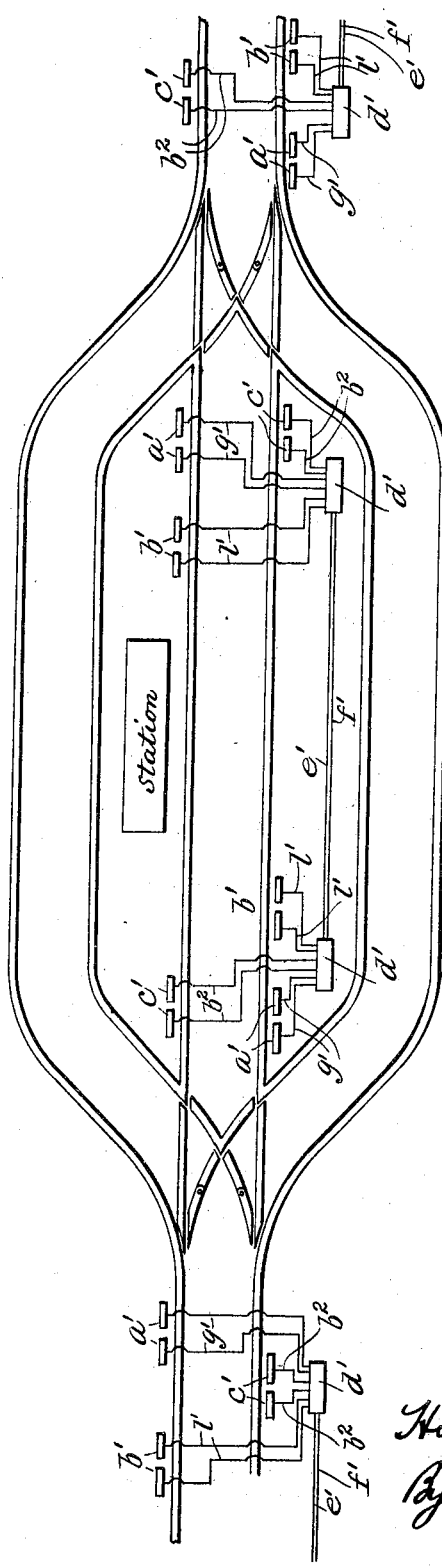

No. 852,635. PATENTED MAY 7, 1907.
H. G. SEDGWICK.
AUTOMATIC ELECTRICAL TRAIN STOP.
APPLICATION FILED NOV. 24, 1905. RENEWED JAN. 2, 1907.
8 SHEETS—SHEET 6.
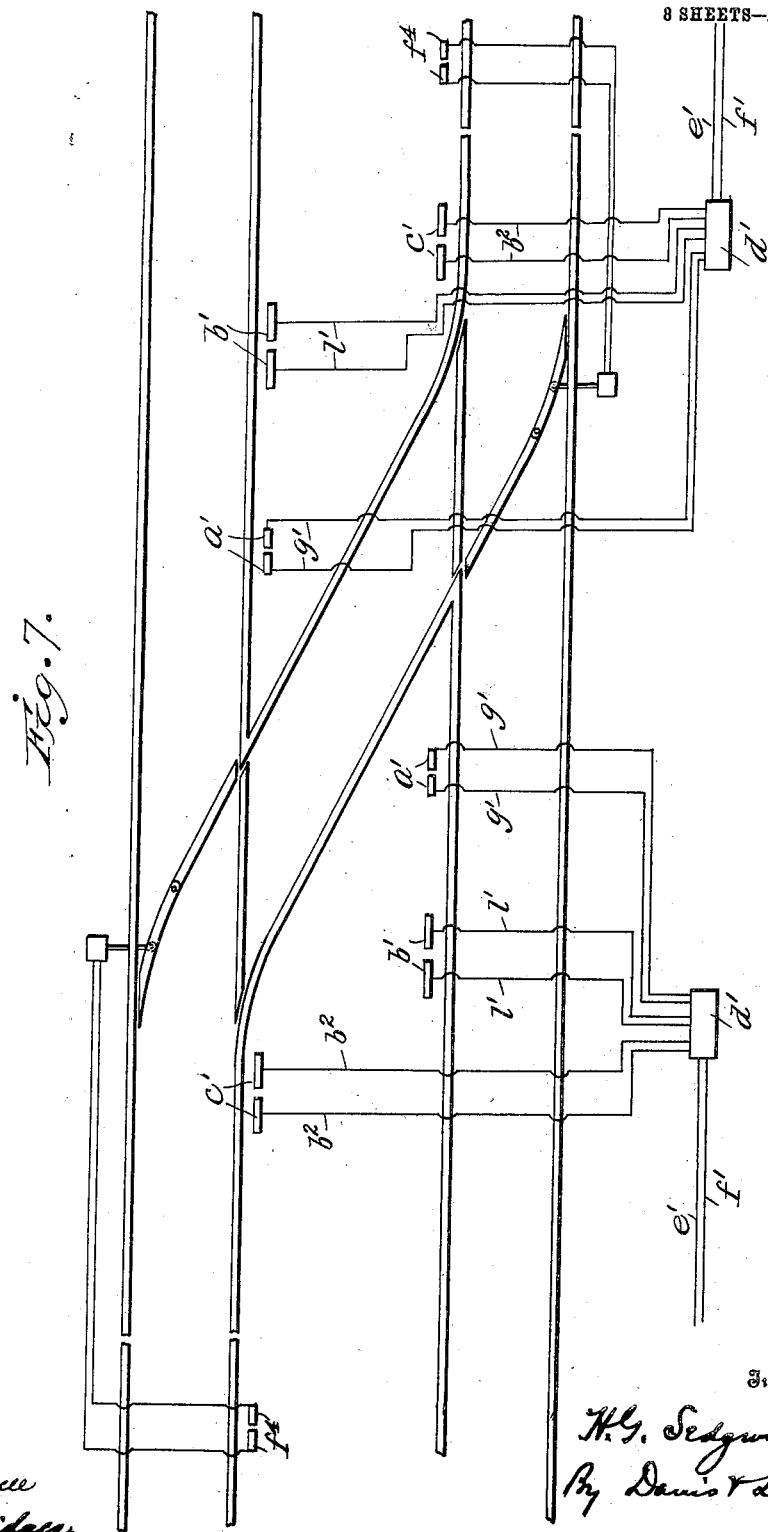
Witnesses
Inventor
H. G. Sedgwick
By Davis & Davis
Attorneys No. 852,635. PATENTED MAY 7, 1907.
H. G. SEDGWICK.
AUTOMATIC ELECTRICAL TRAIN STOP.
APPLICATION FILED NOV. 24, 1905. RENEWED JAN. 2, 1907.
8 SHEETS—SHEET 7.
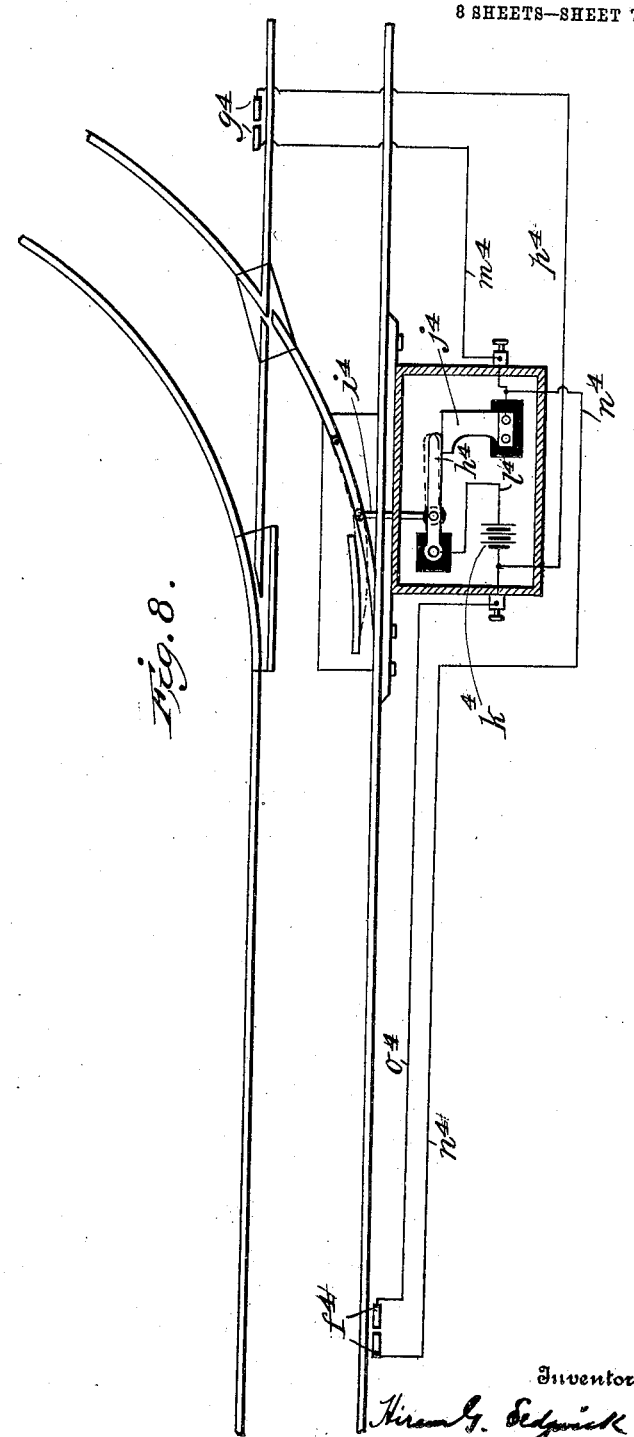
Witnesses
Inventor
Hiram G. Sedgwick,
By Davis & Davis,
Attorneys

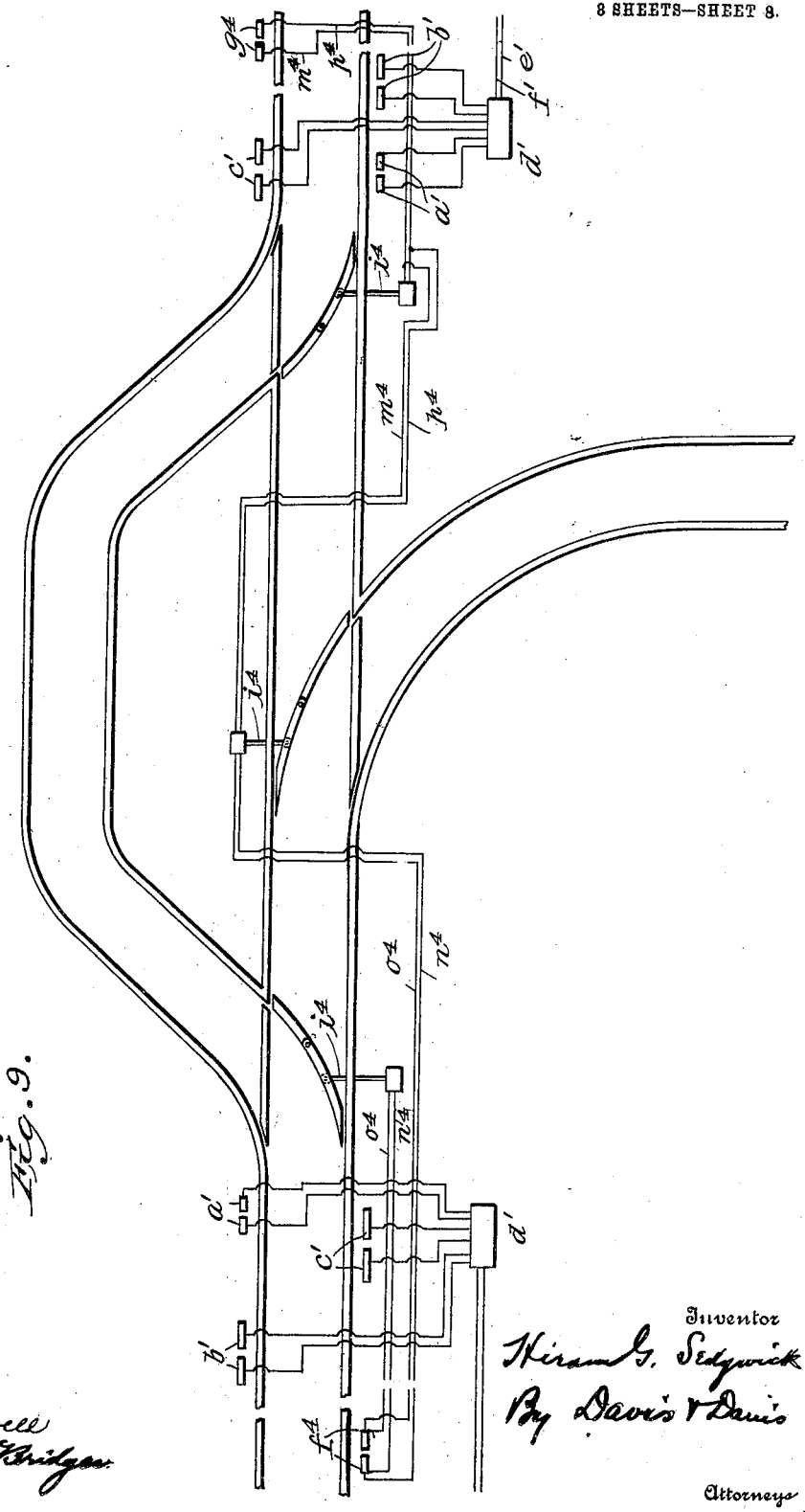

UNITED STATES PATENT OFFICE.

HIRAM G. SEDGWICK, OF MILL VALLEY, CALIFORNIA.

AUTOMATIC ELECTRICAL TRAIN-STOP.

No. 852,635.     Specification of Letters Patent.     Patented May 7, 1907.

Application filed November 24, 1905. Renewed January 2, 1907. Serial No. 350,431.

*To all whom it may concern:*

Be it known that I, HIRAM G. SEDGWICK, a citizen of the United States of America, and a resident of Mill Valley, county of Marin, State of California, have invented certain new and useful Improvements in Automatic Electrical Train-Stops, of which the following is a full and clear specification, reference being had to the accompanying drawings, in which—

Figure 1:
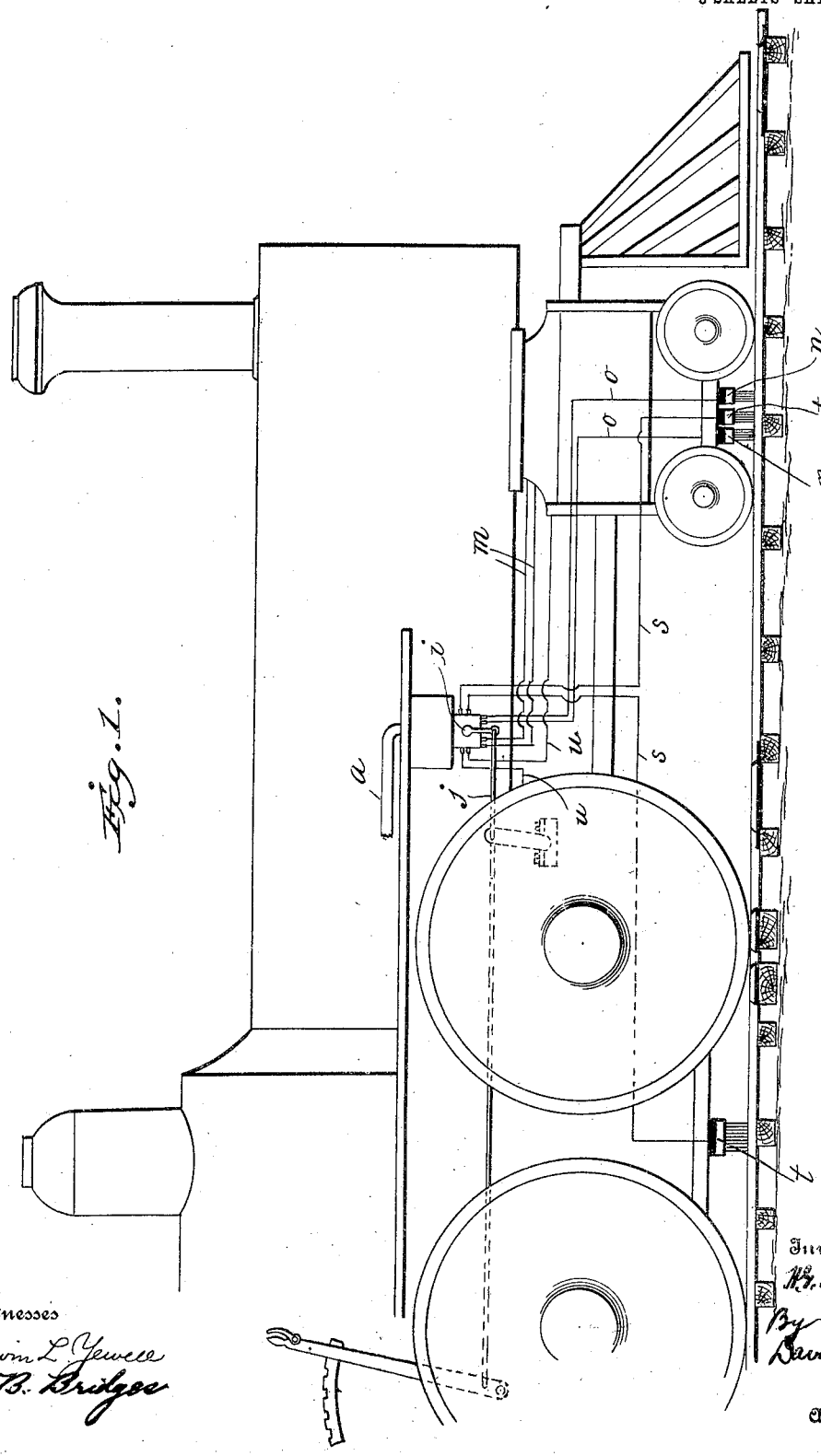
Figure 6:
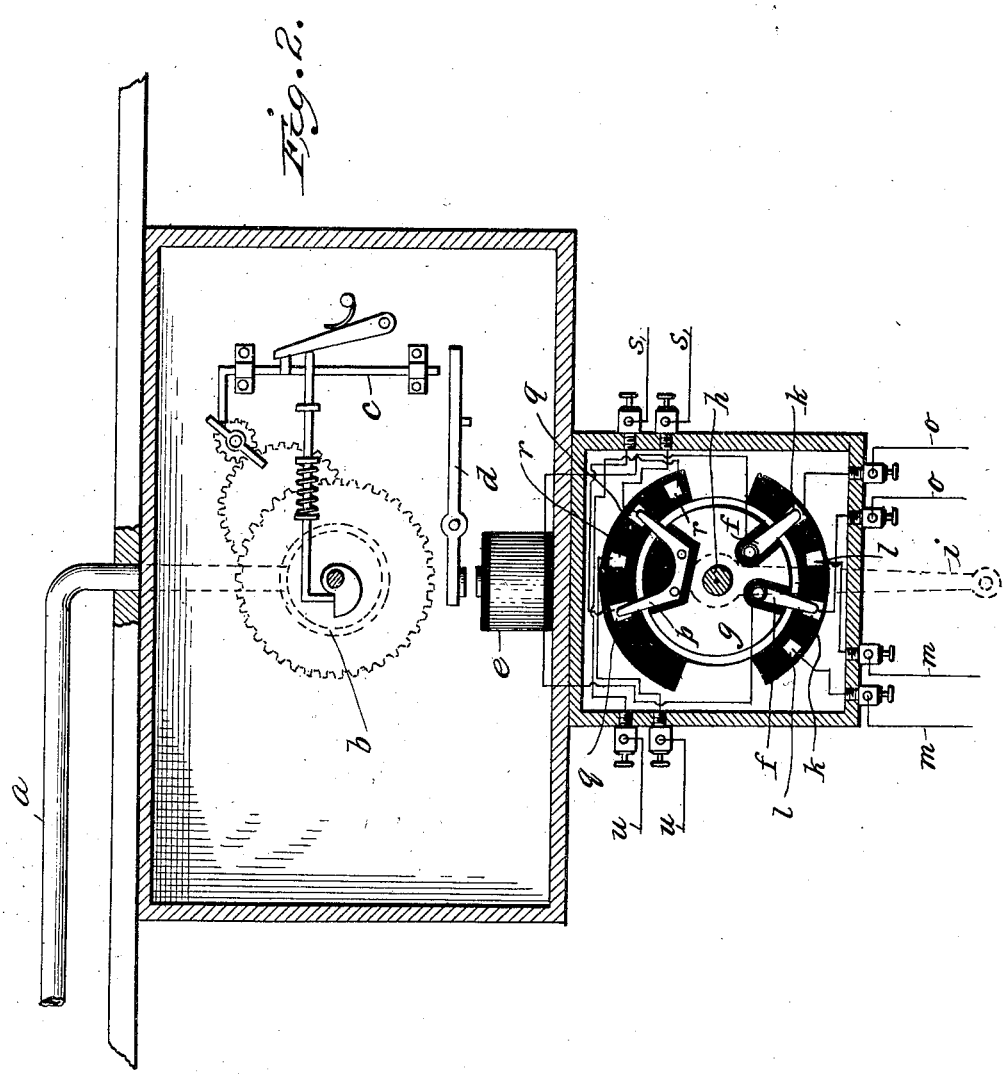

Figure 1 is a diagrammatic view of a locomotive showing the arrangement of contact-brushes and the circuits on the locomotive; Fig. 2 a vertical section showing the reversing switch and the valve-operating mechanism on the locomotive; Fig. 3 a plan of a roadbed showing one section or block of my system; Fig. 4 a detail view showing the arrangement of brushes on both sides of the locomotive; Fig. 5 a view showing the circuits of each of the blocks; Fig. 6 a diagram showing the preferred manner of arranging the block system in connection with a station having adjacent sidings; Fig. 7 shows the preferred manner of arranging the system at a cross-over on a double-track road; and Figs. 8 and 9 plan views showing the means for protecting switches.

This invention has special relation to that class of automatic train-stopping mechanisms in which a valve connected with the train-pipe of the brake mechanism is vented automatically by means on the roadbed when the train approaches a danger zone, the venting of the train-pipe causing the air-brakes to be actuated in the same manner as when vented by the engineer with his controller valve, but it will be obvious that some of the features of the invention are applicable to other types of braking mechanisms.

In its preferred construction, the present invention involves the use of electricity for operating the venting valve, the venting valve being operated automatically by the coming together of contacts carried on the locomotive and contacts carried on the roadbed, a special arrangement of contacts on the locomotive and on the roadbed and suitable circuits and switches being employed, as more fully hereinafter set forth.

In its preferred form the invention embodies means whereby each train as it proceeds on its journey protects itself both in rear and in front by successively throwing into circuit a series of danger contacts, so that collisions will be avoided by each train, as it proceeds, automatically preëmpting a block or section of the track. For single-track railways suitable means are provided for reversing the circuits on the locomotive automatically with the reversal of the engine thereof so that the train will protect itself both fore and aft irrespective of the direction in which it is traveling, as more fully hereinafter set forth.

Referring to Figs. 1 and 2, the letter $a$ designates the train-pipe of the usual air-brake mechanism, which is connected to a suitable venting valve $b$ shown in dotted lines in Fig. 2, this valve being desirably operated by a clock train in the same manner as set forth in my Patent No. 757,571, dated April 19, 1904, the release of this valve-operating mechanism being accomplished by lifting the rod $c$, which, as set forth in said patent, permits the valve to make a complete rotation and thereby vent the pipes sufficiently to apply the brakes. The lifting of this rod is accomplished in the present instance by a pivoted armature lever $d$ which is actuated by an electro-magnet $e$ whose circuit includes a pair of contact-fingers $f$ carried in an insulated condition by a disk $g$, this disk being carried by a shaft $h$ to which is attached a depending arm $i$, this arm being in turn connected to the reach-rod $j$ of the reversing-lever of the locomotive. The contact-fingers $f$ co-act with two pairs of insulated contacts $k$ and $l$, the pair $k$ being connected by wires $o$ to a pair of separated contact-brushes $n$ on the right-hand side of the locomotive and the two wires $m$ leading from the other contacts being connected to a similar pair of contact-brushes $n$ on the other side of the locomotive. Carried by the disk $g$ is another pair of contact-fingers $p$ which are connected together but are insulated from the disk and which are adapted to alternately connect pairs of insulated contacts $q$ and $r$. The pair of contacts $q$ are connected by wires $s$ to a pair of contact-brushes $t$ arranged at the right-hand side of the locomotive, and the contacts $r$ are connected by wires $u$ to a similar pair of contact-brushes on the left-hand side of the locomotive. All the contact-brushes are insulated from the locomotive and are arranged closely adjacent to the roadbed so that as the locomotive moves along the contacts will successively make contact with certain contacts on the roadbed hereinafter described. As will be observed the contacts $n$ are spaced a different distance apart from the contacts $t$ so that as the train moves along each pair of contacts will connect its own roadbed-contacts and no other contacts, for the purpose hereinafter set forth.

It will be observed that in Figs. 1 and 2 the switch $g$ and the reversing-lever of the locomotive are adjusted for going ahead, brushes or contacts $n$ and $t$ on the right side being brought into action through the wires $o$ and $s$. When the reversing-lever of the engine is pulled backward to reverse the engine the switch $g$ will be rotated sufficiently to bring into action the brushes at the left side of the locomotive through the wires $m$ and $u$, thus putting the mechanism into position for backing the locomotive.

The contacts on the roadbed are arranged in series or groups, the safety-contacts $a'$ being arranged at the beginning of each block, the setting-contacts $b'$ being arranged a short distance ahead of the contacts $a'$, and the restore-contacts $c'$ being arranged at the end of the block. In Figs. 3 and 5 the contacts are arranged for a single-track road, one set being arranged at each side of the roadbed so as to be operated by trains going in either direction. At the beginning of each block is conveniently placed a relay or switch-box $d'$ preferably mounted on the usual telegraph-poles adjacent to the roadbed, and these boxes are connected by two line-wires $e'$, $f'$. The restore-contacts $c'$ at the end of a block and also the safety-contacts $a'$ and the setting-contacts $b'$ at the beginning of the same block are connected by wires to one of the relay boxes, but any other suitable arrangement of circuits may be employed.

The safety-contacts are connected by wires $g'$ through a switch $h'$ to a battery $i'$, said switch being adapted to be closed by a magnet $j'$ and to be opened by a magnet $k'$. When the switch $h'$ is closed the safety-contacts are alive and when the switch is open, as shown in Fig. 5, the contacts are dead, that is are cut out from the battery $i'$.

The setting-contacts $b'$ are connected by wires $l'$ to a battery $m'$, one limb of the circuit passing through the magnet of a switch $n'$, this switch being preferably the ordinary telegraph-sounder. The lower contact of this switch is connected to ground through the battery $o'$ and the upper contact is connected to ground through a wire $p'$. The armature lever, which normally bears against the upper contact, is connected by a wire $q'$ with a switch $r'$, this switch being preferably the ordinary relay switch used in telegraphy. The wire $q'$ passes through the magnets of this switch and becomes the line wire $f'$, which leads to the relay box at the other end of the block and connects with the companion switch or relay $r'$ in that box. The relay $r'$, when energized, closes the circuit $t'$ of the closing magnet $j'$, the wires of this circuit being connected to the aforesaid battery $m'$.

In each relay-box the above-described mechanism is duplicated, the opening magnet $k'$ being connected by wires $u'$ to a relay switch $v'$ and a battery $w'$, and one of the wires $x'$ of this relay being connected through the armature lever of a switch $k'$ and a wire $z'$ to ground, while the other wire $a^2$ of this relay goes out of the box and becomes the line wire $e'$ leading to the companion relay switch $v'$ at the other end of the block. The magnet of the sounder-switch $y'$ is connected in circuit with battery $w'$ by the wires $v^2$ with the restore-contacts $c'$. The lower contact of each of the switches $y'$ is connected to ground through a battery $c^2$.

With an arrangement of contacts etc. such as above described it will be observed that if the switch $h'$ is closed and the safety-contacts $a'$ thereby made the terminals of the battery $i'$, a locomotive upon entering the block will be automatically stopped by having its contact-brushes $n$ make contact with said safety contacts, since as said brushes make connection with the safety contacts the current from the battery $i'$ will actuate the magnet $e$ and thereby vent the brake-pipes, but when the battery $i'$ is cut out by the switch $h'$ the safety-contacts will be dead and will have no effect on the valve-operating mechanism on the locomotive. Should the safety contacts be dead the train will be permitted to pass along to the setting-contacts $b'$. When the brushes $t$ on the locomotive pass over these contacts, said brushes being spaced apart the proper distance to make contact with both these contacts at the same time, the battery $m'$ will be brought into action through the circuit wires $l'$ and thus actuate the sounder-switch $n'$. The actuation of this switch $n'$ throws the battery $o'$ into circuit of the relay $r'$ and thus (by closing the circuit $t'$) energize closing magnet $j'$, which closes switch $h'$ and makes the safety-contacts $a'$ alive, thereby closing the block at a suitable point behind the train. After closing the circuit of magnet $j'$ the current passes on through the line wire $f'$ through the companion relay $r'$ in the distant relay box and thence down through the armature lever of the switch $n'$ and through wire $p'$ to ground. In passing through this latter relay switch $r'$ the circuit $t'$ of the magnet $j'$ is closed, thus actuating switch $h'$ and throwing the safety-contacts $a'$ at the other end of the block into circuit of the other battery $i'$, thereby protecting the train at a predetermined distance ahead of it from trains coming in the opposite direction. When the train reaches the restore-contacts $c'$, which are spaced the same distance apart as the setting-contacts $b'$ the same brushes that contacted with the contacts $b'$ also make contact with these contacts $c'$, thereby closing the circuit $b^2$ in which is included the battery $w'$ and the magnet of the adjacent sounder-switch $y'$. Thus actuating the switch $y'$ throws the current from battery $c^2$ up through the adjacent relay $v'$ and thence through line wire $e'$ back to the first relay box and through the companion relay $v'$ to ground through wire $z'$. In passing through the first-mentioned relay $v'$ the circuit $u'$ of magnet $k'$ is closed thus opening switch $h'$ and cutting out battery $i'$ from the safety-contacts nearest the relay box. This restores all the parts to their normal position, in which position the switches $h'$ will be open and all the circuits will be open, thus avoiding waste of current and enabling a single set of batteries to last a great length of time. A train going in the opposite direction will, if the initial safety-contacts $a'$ are dead, operate to protect itself in the same manner, that is, by throwing the safety-contacts at both ends of the block into circuit with their respective batteries, and finally through the restore-contacts open the switches $h'$ and leave the contacts in their normal dead condition.

I have shown and described my system as adapted for single-track railways, but it will be observed that without material modification it may be used on double-track roads, where it is only necessary to protect a train against trains going in the same direction. It will be observed also that I may employ any other suitable system of electrically operated switches in connection with my arrangement of safety-contacts, it being simply necessary to provide means for automatically rendering the safety-contacts operative behind the train as it proceeds and also in front of the train if the system be used on single-track railways. It will be observed that the battery for actuating the vent-valve mechanism may be located upon the locomotive instead of at each relay box, in which case the switches $h'$ would simply serve to metallically connect the safety-contacts. It will be observed that an essential feature in my system is that a pair of safety-contacts shall precede the setting contacts a sufficient distance to stop the train should that block be preempted by another train before the train reaches the next pair of setting-contacts. I have shown the contacts arranged in line with each other both inside and outside the rails but it will be observed that it is within the scope of my invention to arrange the contacts in any other suitable manner; for instance, the contacts may be arranged side by side and parallel, in which case of course the brushes on the locomotive would have to be differently arranged so as to make the proper contact, it being essential only that the selective system I have described be preserved whereby the valve-operating brushes shall come in contact only with the safety-contacts and the other brushes come in contact only with the setting-contacts and the restore-contacts. It will be observed also that I may employ any suitable well-known means such as a pilot brush to clear snow and ice from the contacts, and also that I may employ any suitable contacts on the locomotive in lieu of the brush form of contacts shown.

In Fig. 6 it will be observed that the block which protects the station terminates short of double switches which lead into side-tracks whereby a train stopping at the station will be protected from trains coming from either direction but at the same time said trains may pass around the protected train if they desire to do so by means of the switches and side-tracks.

In Fig. 7 a simple arrangement for a double-track system is shown, and in connection with this arrangement I show a cross-over and a pair of switches therefor which are protected in the manner shown in Figs. 8 and 9, the stopping-contacts of this protector being designated by the character $g^4$, these contacts being adapted to be rendered active whenever the switch is opened to shunt the approaching train into the cross-over, thus preventing the train accidentally running into an open switch. The contacts $f^4$ of each pair are separated and insulated from each other and are so spaced that the brushes $n$ will make contact simultaneously with them, so that in case these contacts are made the terminals of a battery the magnet $e$ will be energized, thereby releasing the vent-valve and venting the brake-pipes and applying the brakes. These contacts $f^4$ are made the terminals of a battery when the switch is open by the simple mechanism shown in Fig. 8, which consists of a movable contact $h^4$ connected to the switch-tongue by a link $i^4$ and adapted when the switch-tongue is thrown against the main rail to open the switch to make contact with a contact $j^4$. The movable contact is connected to a battery $k^4$ by a wire $l^4$, and the stationary contact $j^4$ is connected by two wires $m^4$ and $n^4$ with one of each pair of the roadbed-contacts. The other pole of the battery is connected by two wires $o^4$ and $p^4$ respectively to the other two contacts. It will be observed that when the switch-tongue is moved away from the main rail to close the switch, the movable contact will be moved away from the stationary contact $j^4$ and the battery will thereby be entirely cut out from the roadbed-contacts, and when the switch-tongue is moved to an open position the battery will be in circuit with the stopping-contacts, so that the stopping-contacts will be alive, that is, in condition to actuate the brake mechanism on the locomotive. It will be understood that the roadbed-contacts are to be placed a sufficient distance from the switch to stop the fastest moving train before it reaches the switch in case the switch stands open. It will be observed also that even when the switch is open and the battery is in circuit with the roadbed-contacts no current is being used.

In Fig. 9 I show a simple way of connecting up a series of switches at a side-track and a junction and one way in which this invention may be employed in combination with my train-stopping system covered by my application aforesaid.

It will be understood that wherever I use the word locomotive I employ the term in its broad sense so as to include all railway motor vehicles whether driven by steam or electricity or other motive power. The advantage in arranging the contacts and the brushes in line with each other, that is in tandem, lies in the fact that the contacts will be thereby kept clear of accumulations of dirt, ice, etc.

It will be apparent to those skilled in the art that various mechanical embodiments of the invention are possible and I, therefore, do not wish to be limited to th exact arrangement and construction shown.

What I claim and desire to secure by Letters Patent is:—

1. In a train-stopping block system, the combination of a locomotive equipped with a brake apparatus and magnetically controlled means for applying the brakes, said means embodying a pair of brushes, another pair of brushes on the locomotive electrically connected and spaced apart lengthwise a distance differing from the distance separating the other two brushes, and a series of pairs of contacts on the roadbed, the contacts of one of the pairs being spaced lengthwise to make contact with one pair of brushes and the contacts of the other pair being spaced lengthwise so as to make contact with the other pair of brushes, all the brushes and all the contacts being arranged in tandem, so that all the brushes sweep all the contacts, and electrically-controlled connections and circuits connected to said contacts.

2. In combination, a locomotive equipped with a brake apparatus, electrically-controlled means for applying the brakes, said means embodying a pair of train-stopping brushes electrically connected, another pair of bridging brushes carried by the locomotive and electrically connected, and roadbed appliances embodying a pair of stopping-contacts, a pair of setting-contacts beyond the stopping-contacts, and a set of restoring-contacts beyond the setting-contacts, the setting-contacts and the restoring-contacts being arranged to connect in succession only the setting brushes, and the stopping-contacts being arranged to connect only the stopping-brushes, all the brushes and all the contacts being arranged in tandem, so that all the brushes sweep all the contacts, and electrical devices connecting the contacts for the purpose substantially as herein described.

3. In combination, a locomotive equipped with a brake apparatus, electrically-controlled means for applying the brakes, said means embodying a pair of train-stopping brushes electrically connected, another pair of bridging brushes carried by the locomotive and electrically connected, and roadbed appliances embodying a pair of stopping-contacts, a pair of setting-contacts beyond the stopping-contacts, and a set of restoring-contacts beyond the setting-contacts, the setting contacts and the restoring-contacts being arranged to connect in succession only the setting brushes, and the stopping contacts being arranged to connect only the stopping-brushes, an electrical circuit connected to the stopping-contacts and embodying a switch and a local battery, a circuit including a local battery connected to the setting-contacts and adapted to close the switch when the setting-contacts are bridged, and a circuit including a local battery connected to the restore-contacts and adapted to open said switch when bridged by the brushes, substantially as set forth.

4. In combination, a locomotive equipped with a brake apparatus, electrically-controlled means for applying the brakes, said means embodying a pair of train-stopping brushes electrically connected, another pair of bridging brushes carried by the locomotive and electrically connected, and road bed appliances embodying a pair of stopping-contacts, a pair of setting-contacts beyond the stopping-contacts, and a set of restoring-contacts beyond the setting-contacts, the setting contacts and the restoring-contacts being arranged to connect in succession only the setting brushes, and the stopping contacts being arranged to connect only the stopping brushes, and a duplicate series of contacts arranged in the reverse order on the other side of the roadbed for trains going in the opposite direction, and electrical connections whereby the bridging of either pair of setting-contacts will set both pairs of stopping-contacts, and the bridging of either pair of restore-contacts will restore both pairs of stopping-contacts.

5. In combination, a locomotive equipped with a brake apparatus, electrically-controlled means for applying the brakes, said means embodying a pair of train-stopping brushes electrically connected, another pair of bridging brushes carried by the locomotive and electrically connected, and roadbed appliances embodying a pair of stopping-contacts, a pair of setting-contacts beyond the stopping-contacts, and a set of restoring-contacts beyond the setting-contacts, the setting-contacts and the restoring-contacts being arranged to connect in succession only the setting brushes, and the stopping-contacts being arranged to connect only the stopping-brushes, and a duplicate series of contacts arranged in the reverse order on the other side of the roadbed for trains going in the opposite direction, and electrical connections whereby the bridging of either pair of setting-contacts will set both pairs of stopping-contacts, and the bridging of either pair of restore-contacts will restore both pairs of stopping-contacts, said electrical connections consisting essentially of a local battery in circuit with each pair of contacts and having a double switch in its circuit, an independent local circuit and battery for each magnet of the double switch, and connections whereby the two switches are opened and closed simultaneously.

6. In combination, a locomotive equipped with a brake apparatus and electrically-controlled means for applying the brakes, said means embodying stopping-brushes electrically connected and another pair of bridging brushes, and roadbed appliances embodying a pair of stopping-contacts, a pair of setting-contacts beyond the stopping-contacts, a pair of restoring-contacts beyond the setting-contacts, a duplicate series of pairs of contacts arranged in reverse order on the other side of the roadbed for trains going in the opposite direction, and electrical connections whereby the bridging of either pair of setting-contacts will set both pairs of stopping-contacts and the bridging of either pair of restore-contacts will restore both pairs of stopping-contacts to normal, said electrical connections embodying an independent circuit for each pair of stopping-contacts this circuit including a switch and a local battery, local circuits and batteries connected to each pair of setting-contacts and to said switch and adapted to close both switches when the setting-contacts are bridged, and local circuits and batteries connected to each pair of restore-contacts and to said switches and adapted to open both switches when the restore-contacts are bridged.

7. In combination, a locomotive equipped with a brake apparatus and electrically controlled means for actuating the same, said means embodying two pairs of separated contact-brushes at each side of the locomotive and circuit wires for each pair of brushes, and means connected to the reverse lever of the locomotive so as to be automatically actuated by reversal of the direction of movement of the locomotive for bringing into action the brushes at one side and cutting out the brushes at the other side, and sets of contacts and circuits on the roadbed, for the purposes set forth.

In testimony whereof I hereunto affix my signature in the presence of two witnesses this 2d day of November 1905.

HIRAM G. SEDGWICK.

Witnesses:
S. H. ROBERTS,
W. M. THACKER.